United States Patent
Fujita et al.

(10) Patent No.: US 6,950,276 B2
(45) Date of Patent: Sep. 27, 2005

(54) DISK DRIVE MOTOR AND DISK DRIVE STORAGE DEVICE INCORPORATING SAME

(75) Inventors: Yuji Fujita, Yokohama (JP); Asao Nakano, Kamakura (JP); Yasuo Amano, Yokohama (JP); Nobuyuki Ushifusa, Yokohama (JP); Kouki Uefune, Odawara (JP); Takashi Yamaguchi, Tsuchiura (JP); Toshiyuki Ajima, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/226,909

(22) Filed: Aug. 22, 2002

(65) Prior Publication Data

US 2004/0001281 A1 Jan. 1, 2004

(30) Foreign Application Priority Data

Jun. 27, 2002 (JP) ........................................ 2002-187044

(51) Int. Cl.$^7$ ............................................. G11B 17/02
(52) U.S. Cl. ..................................................... 360/99.08
(58) Field of Search ........................... 360/99.08, 99.04, 360/98.07, 98.04, 98.01, 105–106; 310/40 MM, 90, 162–164, 261, 267–268, 308–309

(56) References Cited

U.S. PATENT DOCUMENTS

| 3,914,859 | A | * | 10/1975 | Pierson ......................... 29/596 |
| 4,719,377 | A | * | 1/1988 | Horie et al. ................... 310/44 |
| 5,710,466 | A | * | 1/1998 | Allen et al. ............ 310/40 MM |
| 6,208,485 | B1 | * | 3/2001 | Chainer et al. ........... 360/98.07 |
| 6,384,502 | B1 | * | 5/2002 | Masuzawa et al. ......... 310/152 |
| 6,430,001 | B1 | * | 8/2002 | Chainer et al. ........... 360/99.08 |

FOREIGN PATENT DOCUMENTS

JP 06-054468 2/1994

* cited by examiner

*Primary Examiner*—Angel Castro
(74) *Attorney, Agent, or Firm*—Townsend and Townsend and Crew LLP

(57) ABSTRACT

A disk drive comprising a rotor, to which a disk and a plurality of magnets are fixed, and an open-slot type integrally molded stator disposed about an outer periphery of the magnets, and wherein the stator comprises coils formed by etching metallic films on teeth. The invention may also be applied to a closed-slot type stator. With either type, it is possible to produce an opening that is equal to or smaller than the thickness of a coil wire and cogging torque is minimized.

9 Claims, 6 Drawing Sheets

RCC: Resin Coated Copper

DISK DRIVE MOTOR AND DISK DRIVE STORAGE DEVICE INCORPORATING SAME

BACKGROUND OF THE INVENTION

The invention relates to a disk drive motor for rotating a disk or disks and to a disk storage device in which it is incorporated.

Ordinarily, a stator of a spindle motor of a disk drive has an open-slot construction, in which slot intervals are larger in width than a conductive coil wire. A stator coil is formed in a wrapping system where a tool is inserted into a slot interval and a coil wire is wrapped around a tooth stator tooth coil forming section, or which uses a fitting system where a formed coil is fitted on a tooth. There is also a closed-slot construction described in Japanese Patent Laid-Open No. 54468/1994. A method of forming a coil in this closed-slot construction includes the wrapping system.

In some cases, cogging torque is generated in a magnetic circuit of a disk drive that results in jerking or disrupted rotation. In particular, in attempting to reduce the disk diameter and or the overall shape of a disk and to produce a thin disk drive, it is necessary to increase magnetic forces to ensure the required torque. However, when a magnet producing large magnetic forces is used, for example, a Nd—Fe—B sintering magnet, an intense magnetic field can be generated but the cogging torque problem is also increased. To suppress such cogging torque, it is effective to decrease the radial gaps at the tooth tip ends to smoothly change the magnetic poles as in the above-mentioned prior art.

In using a closed-slot construction, as described in the above-mentioned Japanese Patent Laid-Open No. 54468/1994, in which the tooth are caulked on a connecting part, the closed-slot construction can be fabricated but the increased number of parts causes problems such as increased assembling cost, degradation in durability at connections, increased thickness of the completed disk drive, or the like.

In using an open-slot construction and a wrapping system in which the interval between adjacent tooth slits is decreased to the minimum thickness of a coil wire or less, the coil wire cannot be inserted into the slit, so the slit width must be enlarged by alteration to afford passage of the coil wire. When reworking is carried out to restore the original form, however, an accurate restoration is difficult, so that an area facing a rotor magnet is inevitably decreased. Since the tooth tip ends are opposed to a permanent magnet of a rotor to generate torque, torque is decreased when the area facing the rotor magnet is decreased.

Moreover, since passage by enlarged pieces (minimum slit width) at the tooth tip ends is necessary when using the fitting system, alterations must be made in the same manner as above. That is, in both the closed-slot and open-slot construction, in which slot intervals are equal to or smaller in width than a coil wire, a coil has never been formed without reworking the tooth that constitute a stator core.

BRIEF SUMMARY OF THE INVENTION

An object of the invention is to make a disk drive, in which torque is not decreased even when using a closed-slot open-slot construction in which slot intervals are equal to or smaller in width than a coil wire. The above problems are solved by the following embodiments of the invention.

In one aspect of the invention, a disk drive motor comprises a rotor to which a disk and a plurality of magnets are fixed, and an open-slot type integrally molded stator disposed about an outer periphery of magnets, with the stator comprising coils formed by etching metallic films on the teeth. In this manner, since the slot width can be decreased irrespective of the thickness of a conductive coil, it is possible to realize a disk drive motor with nominal cogging torque that is capable of smooth rotation.

Further, when the minimum width of the slots is equal to or smaller than the minimum thickness of a coil wrapped around the stator, reduction in torque can be suppressed by using the above stator. In another aspect of the invention, a disk drive motor comprises a rotor, to which a disk and a plurality of magnets are fixed, and a stator provided with coils that are formed by etching metallic films on closed-slot type stator tooth disposed about an outer periphery of the magnets.

Ordinarily, when using closed-slot type integrally molded teeth for a stator core, a coil conductor cannot be formed unless a special winding machine is used. With the above configuration, a stator coil can be formed without the use of any special winding machine. Moreover, since the slot width can be decreased irrespective of the thickness of a coil conductor, it is possible to realize a disk drive with small cogging torque and that is capable of smooth rotation.

DESCRIPTION OF THE PREFERRED EMBODIMENTS

Figure 1:
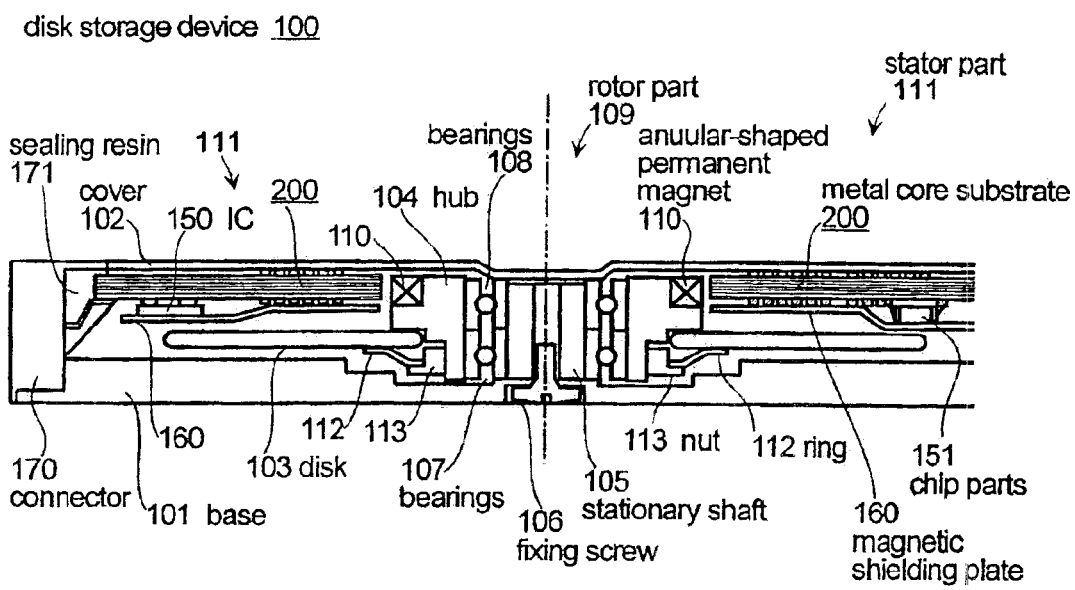
FIG. 1 is a cross-sectional view showing an essential portion of a disk drive.

FIG. 1 is a view showing a portion of a mounting structure of a disk drive according to the invention. A disk storage drive 100 is constructed such that a space enclosed by a base 101, a connector 170 and a cover 102 mounts therein a disk 103 having an outside diameter of 1 inch, a rotor 109 for driving the disk, and a stator 111, the storage device having the same outside dimension (43 mm×36 mm×3.3 mm) as that of a compact flash memory.

A stationary shaft 105 is fixed to base 101 by a fixing screw 106. A hub 104 is rotatably supported on stationary shaft 105 by bearings 107, 108. Disk 103 is fixed to hub 104 by a ring 112 and a nut 113. An annular-shaped permanent magnet 110 is fitted onto an upper surface of hub 104. A metal core substrate 200 and wirings formed on the front and back sides of the metal core substrate function as a wiring substrate mounting thereon parts such as a stator, ICs etc. The wiring substrate is fixed at four corners thereof to projections (not shown) of base 101. A circuit layer is formed on metal core substrate 200 to electrically connect an IC 150 and chip parts 151 by soldering or gold wires, and mounts on an end thereof a connector 170 formed with a plurality of signal pins through-which external electric signals are received from and transmitted to disk storage device 100.

To prevent particles entering from outside of disk storage device 100 from adhering to surfaces of disk 103, a sealing resin 171 is applied on the connector 170 to be heated and cured, thereby plugging through-holes formed in connector 170. A magnetic shielding plate 160 is provided between metal core substrate 200 and disk 103 to be fixed and mounted to a surface of metal core substrate 200. The shielding plate shuts off magnetism generated from the metal core substrate thereby inhibiting influences on disk 103.

Figure 2:
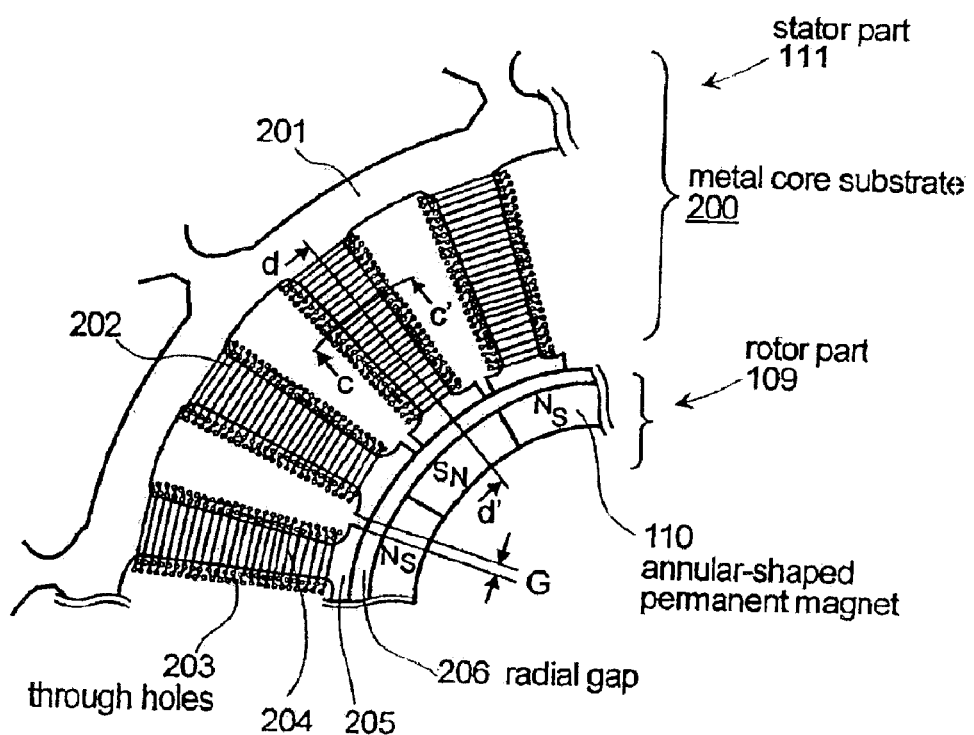
FIG. 2 is a schematic view showing parts of a rotor and a stator in a disk drive motor as viewed from a direction of a rotating axis.

FIG. 2 is a schematic view showing parts of rotor 109 and stator 111 in the disk drive motor as viewed from the direction of a rotating axis. Annular-shaped permanent magnet 110 constitutes a rotor 109, and is divided circumferentially into a desired number of poles, for example, twelve or sixteen poles, to be magnetized. The direction of magnetization is radialas indicated by N poles and S poles in the figure.

Metal core substrate 200 includes a teeth connection 201, teeth coil forming portions 204, teeth tip ends 205, wirings 202, and through holes 203. The teeth connection 201 is a laminated plate composed of thin sheets of a soft magnetic material, for example, silicon iron, and constructed to result in minimal motor iron loss. The teeth coil forming portions 204 and teeth tip ends 205 are constructed in the same manner as the teeth connection, the teeth tip ends 205 being opposed to annular-shaped permanent magnet 110 with a radial gap 206 therebetween. The teeth coil forming portions 204 comprise the number of teeth, usually 18 or 24 i.e. 1.5 times the number of poles of the annular-shaped permanent magnet 110.

Wirings 202 are formed on the front and back surfaces of the teeth connection 201 and teeth coil forming portions 204 with insulating layers therebetween. The wirings on the teeth connection 201 constitute an electronic circuit capable of mounting thereon electronic parts and are connected to the wirings on the teeth coil forming portions 204. The wirings on the front and back surfaces of the teeth coil forming portions 204 are connected to each other at through-holes 203 in a resin disposed between the teeth coil forming portions 204 and adjacent teeth coil forming portions, thus providing a winding structure, which wraps the teeth coil forming portions 204. Thus the electronic parts mounted on the teeth connection 201 control an electric current flowing through the wirings to thereby control a magnetic field generated about the annular-shaped permanent magnet 110 to produce torque for rotating rotor 109.

G denotes the spacing between adjacent teeth tip ends 205. When the spacing G is decreased or the teeth tip ends 205 are shaped to connect to one another, a part of lines of magnetic force inside the teeth tip ends is permitted to flow to adjacent teeth tip ends 205 whereby the magnetic forces with which annular-shaped permanent magnet 110 and the teeth tip ends 205 attract each other are decreased, and so the cogging torque is decreased.

Figure 3:
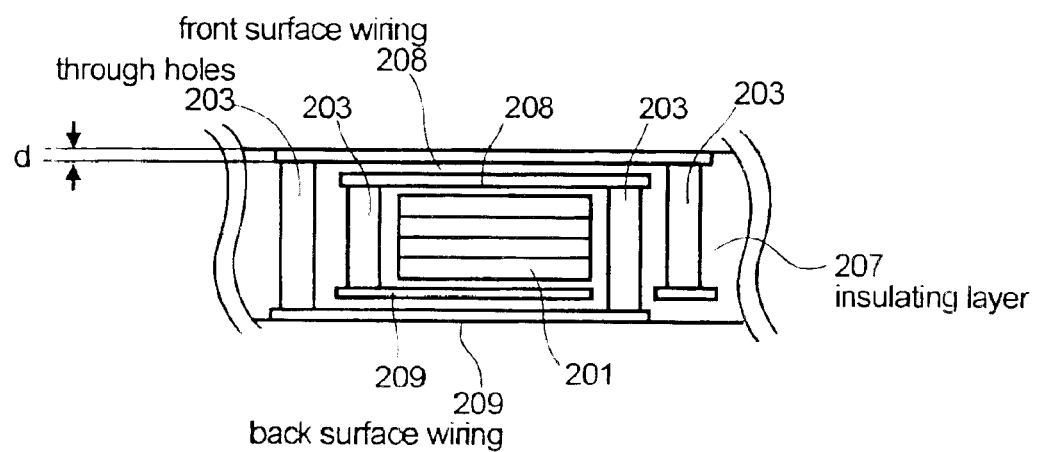
FIG. 3 is a view showing an essential part of the structure of the disk drive motor taken along a cut plane c–c' shown in FIG. 2.

FIG. 3 shows a cross-sectional view of an essential part of the disk drive motor structure taken along a cut plane c–c' in FIG. 2. Metal core substrate 200 is composed of two-layered front surface wirings 208, two-layered back surface wirings 209, teeth coil forming portions 204, the through-holes 203, and insulating layer 207. The embodiment provides a winding construction in which the wirings are wound two times around the teeth coil forming portions 204. When the wiring layer is made further multi-layered in the process of forming metal core substrate 200, the windings may be further increased.

Figure 4:
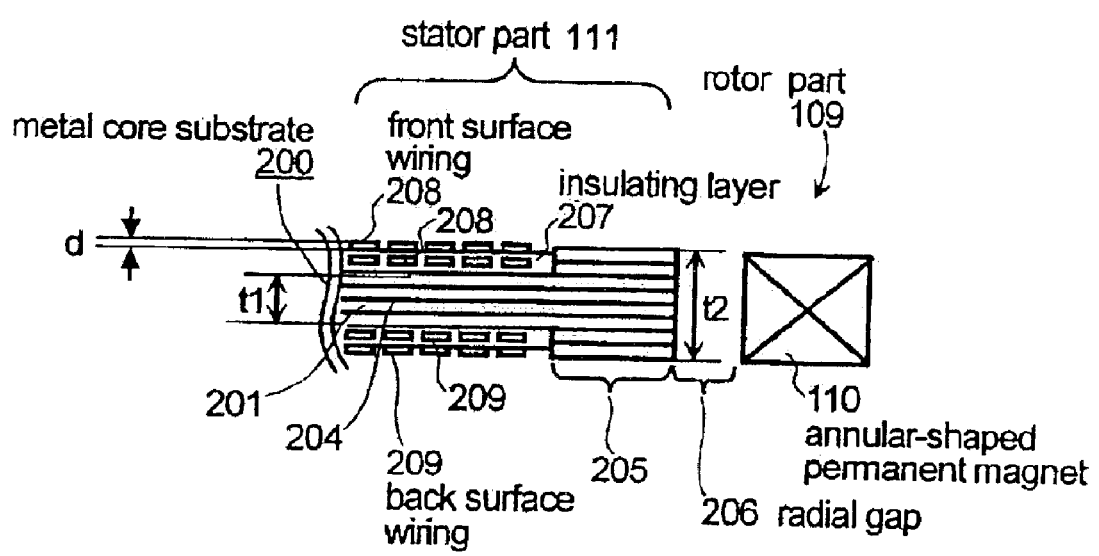
FIG. 4 is a view showing an essential part of the structure of the disk drive motor taken along a cut plane d–d' shown in FIG. 2.

FIG. 4 shows a part of the disk drive motor structure taken along a cut plane d–d' in FIG. 2. The teeth connection 201 is constructed such that four thin sheets formed from silicon iron and having a thickness of about 0.1 mm are stacked on one another in the teeth coil forming portions 204 and have a total thickness t1 of about 0.4 mm. In addition, two thin sheets are applied on the front and back surfaces of iron core piece tip ends 205, respectively, and a total thickness t2 amounts to about 0.8 mm. Thus, by increasing the thickness of iron core piece tip ends 205, magnetic flux from annular-shaped permanent magnet 110 can be efficiently caught to ensure torque, and by forming the tooth coil forming portions 204 in areas other than the iron core piece tip ends to make the same thin sheets, making the stator thin can be achieved.

Reference d in FIGS. 3 and 4 denotes the wiring thickness of front surface wiring 208 or back surface wiring 209, of which the wire conductor is of a minimum thickness. In a motor construction, in which a conventional winding is wrapped around teeth coil forming portions 204, coils can be inserted about the teeth coil forming portions by enlarging the spacing G shown in FIG. 2 as compared to the winding thickness d. An advantage of the invention is that the coils, iron core pieces and wiring substrate can be formed as a unit, so that there is no need to enlarge the spacing G as compared to the winding thickness d, and the spacing G may be made equal to or smaller than the winding thickness d. Further, the spacing G=0, that is, a configuration in which the teeth tip ends 205 are connected to one another, is also possible.

Figure 5:
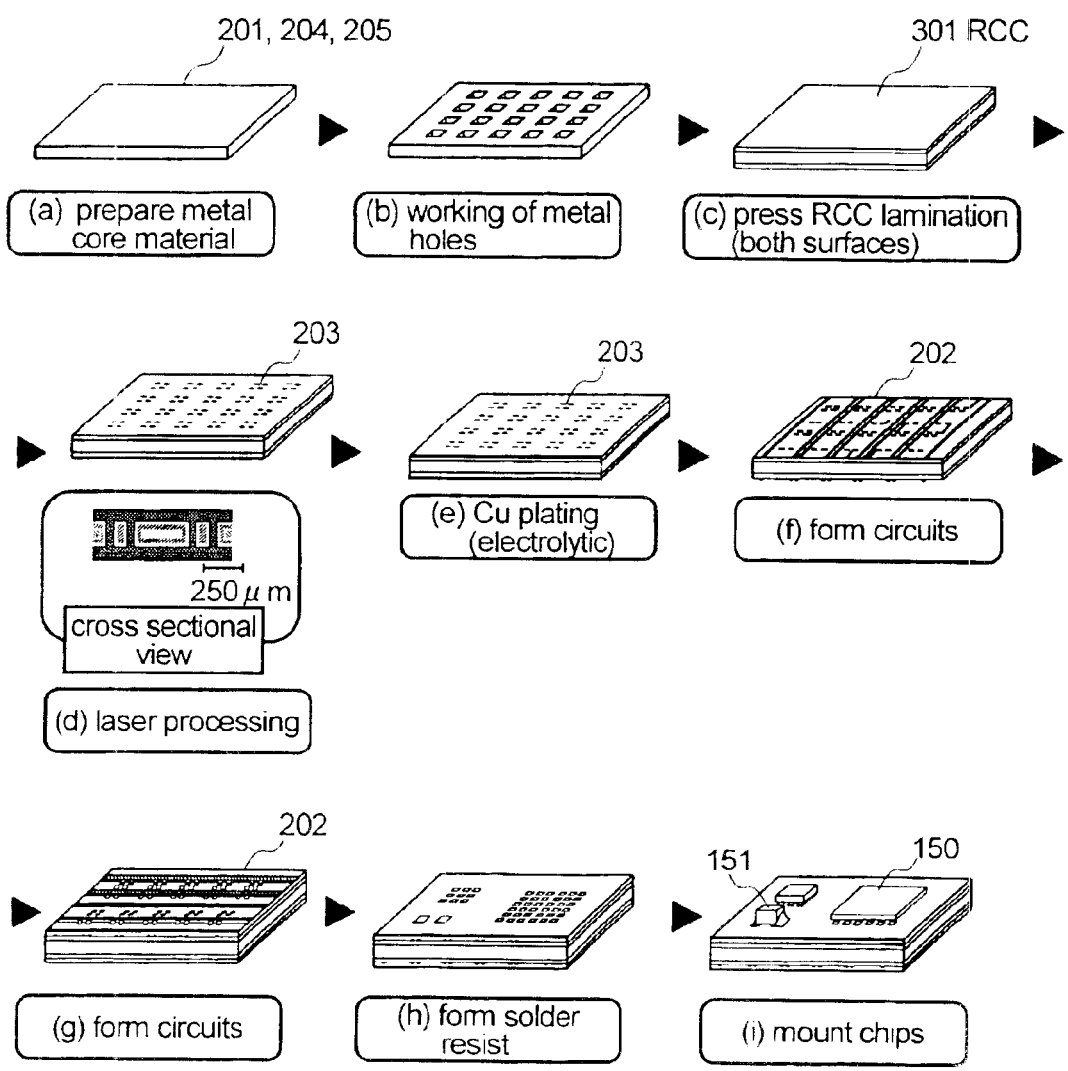
FIG. 5 illustrates a procedure for forming a metal core substrate.

FIG. 5 shows a procedure for forming metal core substrate 200. (a) Teeth connection 201, teeth coil forming portions 204 and the teeth tip ends 205 are prepared as metal core materials, all of which are formed from silicon iron having minimal iron loss and a thickness of about 0.1 mm. (b) The teeth tip ends are shaped by chemical etching and four magnetic metal sheets are laminated with an adhesive. (c) A RCC (Resin Coated Copper), being copper foil and coated beforehand on one side thereof with a resin adhesive layer, is applied on the front and back surfaces of teeth connection 201, teeth coil forming portions 204 and teeth tip ends 205. (d) A drill or laser is used to form through-holes 203 extending through the core materials of the metal substrate. (e) The inner walls of through-holes 203 are then copper plated. (f) By etching the copper foil, circuit patterns 202 in an X-direction are formed on the front and back surfaces of the substrate. At this time, wirings on flat portions of coils surrounding the teeth coil forming portions 204 are simultaneously formed. (g) The RCC is further laminated on the front and back surfaces, and circuit patterns 202 in a Y-direction are formed by etching in the same manner as the above. Here, second layer wirings are formed on the flat portions of coils surrounding teeth coil forming portions 204. Through-holes connecting with the first layer through-holes and wirings are formed, and the interior of the through-holes are then copper plated. (h) A solder resist layer is formed to prevent dispersion of solder for soldered parts. (i) After solder is supplied by printing, a chip mounter is used to mount the IC 150 and the chip parts 151 and the parts are soldered in a reflow furnace. At this time, a connector is also mounted.

According to the above procedure, formation of the metal core substrate and mounting of parts are completed, and resin 171 is used to seal the side of the connector as shown in FIG. 1. After mounting disk 103 on hub 104, fixing screw 106 is used to fix rotor part 109 including bearings 107, 108 to base 101. Thereafter, metal core substrate 200 mounting thereon magnetic shielding plate 160 is fixed to projections (not shown) formed at four corners of the base 101. Finally, cover 102 is mounted and the disk storage device is completed.

Figure 6:
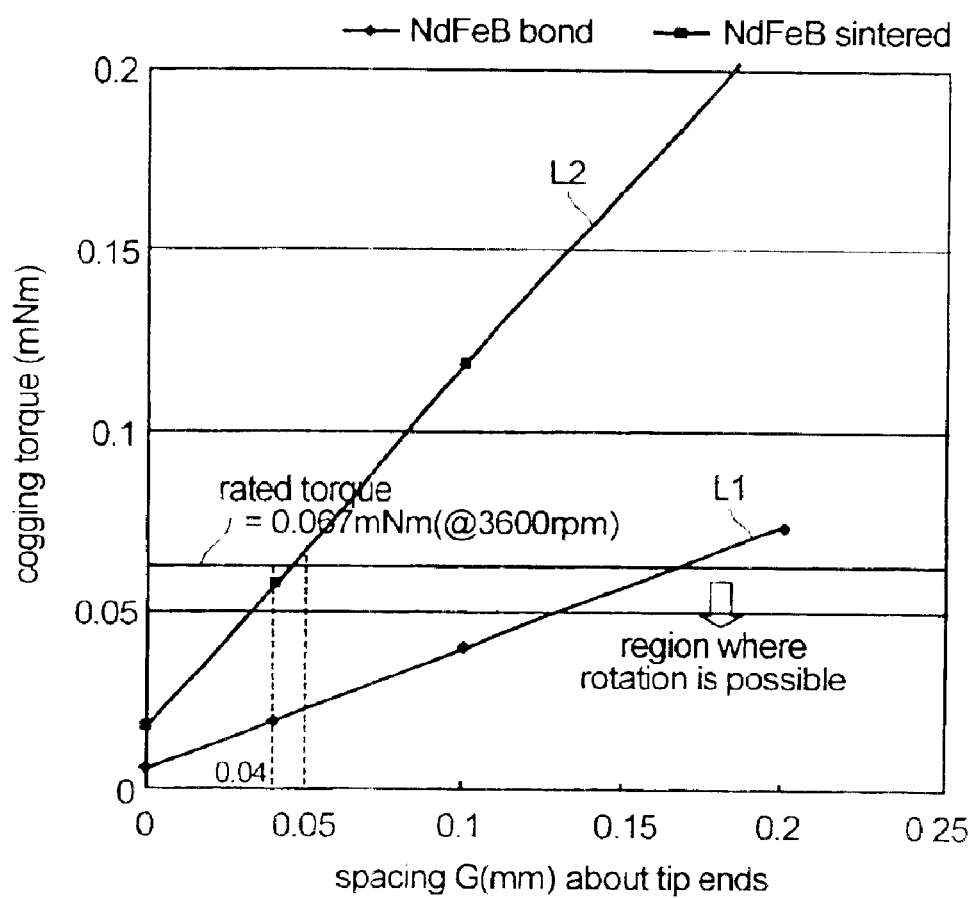
FIG. 6 is a graph showing the relationship between the spacing G about iron core piece tip ends and the cogging torque in motors with Nd—Fe—B bond magnets and Nd—Fe—B sintered magnets.

FIG. 6 shows a graph, in which an axis of abscissa represents a spacing G about teeth tip ends 205 and an axis of ordinates represents cogging torque. L1 indicates a cogging torque of a motor including conventional Nd—Fe—B bond magnets. L2 indicates a cogging torque of a motor including Nd—Fe—B sintered magnets having a higher performance. With L1, motor rotation is possible even in the range of G=0.1 to 0.15 mm since the cogging torque is not in excess of torque (=0.067 mNm) at the time of rated rotation (@3600 rpm). In contrast, with L2 the cogging torque amounts to about three times that with L1, and is in excess of torque (=0.067 mNm) at the time of rated rotation (@3600 rpm) when in the range of G=0.05 mm or more, and therefore motor rotation becomes impossible, so that the spacing must be within the range of G=0.04 mm or less.

With that motor construction, in which a conventional winding is wrapped around teeth coil forming portions 204, the coil has a diameter of about 0.06 to 0.07 mm and so cannot be inserted about the teeth coil forming portions 204 when the spacing is in the range of G=0.04 mm or less. While coil formation is possible provided that the winding has a diameter of 0.04 mm or less, coil resistance is increased leading to an increase in energy loss due to current.

According to the invention, the storage device can be created in principle even when the thickness of the wiring is equal to or smaller than the spacing G, so that spacing in the range of G=0.04 mm or less can be produced. Accordingly, reduction in cogging torque is made possible with the Nd—Fe—B sintered magnet, which is higher in performance than conventional magnets, and the design of a thin motor with high torque becomes possible.

According to the above embodiment, the stator coil is formed without the use. of slit openings, so slit intervals can be small. In particular, it is possible to fabricate both closed slots and open slots in which an opening is equal to or smaller than a thickness of a coil wire.

What is claimed is:

1. A disk drive motor comprising:
   a rotor to which a disk is fixed, wherein the rotor has a plurality of magnets fixed at its outer periphery to be arranged in a plane facing a main surface of the disk; and
   an integrally molded stator being disposed about the outer periphery of the rotor and having a plurality of teeth each of which has one of its ends thereof facing the plurality of magnets and another of the ends thereof extended away from the rotor,
   wherein each of the teeth is connected to one another at one of the ends thereof, is spaced from another of the plurality of teeth adjacent thereto at one of the ends thereof, and has a metal core substrate provided between the ends thereof,
   wherein the metal core substrate provided in each of the teeth is a coil composed of front surface wirings formed on a front surface of each of the teeth, back surface wirings formed on a back surface thereof opposite to the front surface thereof, and plated through holes formed at both of the side surfaces thereof in an insulating layer covering the side surfaces thereof, wherein each of the plated through holes connects electrically to one of the front surface wirings and one of the back surface wirings,
   wherein the front surface wirings are formed by etching a metallic film disposed on the front surface of each of the teeth, and the back surface wirings are formed by etching a metallic film disposed on the back surface of each of the teeth, and
   a minimum width spacing each of the teeth from another of the plurality of teeth adjacent thereto at one of the ends thereof is equal to or smaller than a minimum thickness of the front surface wirings and the back surface wirings on each of the teeth.

2. The disk drive motor as described in claim 1 wherein each of said teeth is formed of a soft magnetic material.

3. The disk drive motor as described in claim 2, wherein each of said teeth is formed of a laminated plate composed of thin sheets of said soft magnetic material.

4. The disk drive motor as described in claim 2, wherein said soft magnetic material is silicon iron.

5. The disk drive motor as described in claim 1, wherein said metallic film is a copper foil.

6. The disk drive motor as described in claim 1, wherein said metallic film is a foil having one side thereof coated with a resin adhesive layer.

7. The disk drive motor as described in claim 1, wherein said plurality of magnets is provided as an annular-shaped permanent magnet disposed around the rotor.

8. The disk drive motor as described in claim 1, wherein said back surface of each of said teeth faces said disk.

9. The disk drive motor as described in claim 1, wherein said plated through holes have inner walls plated with copper.

* * * * *